United States Patent Office 3,313,408
Patented Apr. 11, 1967

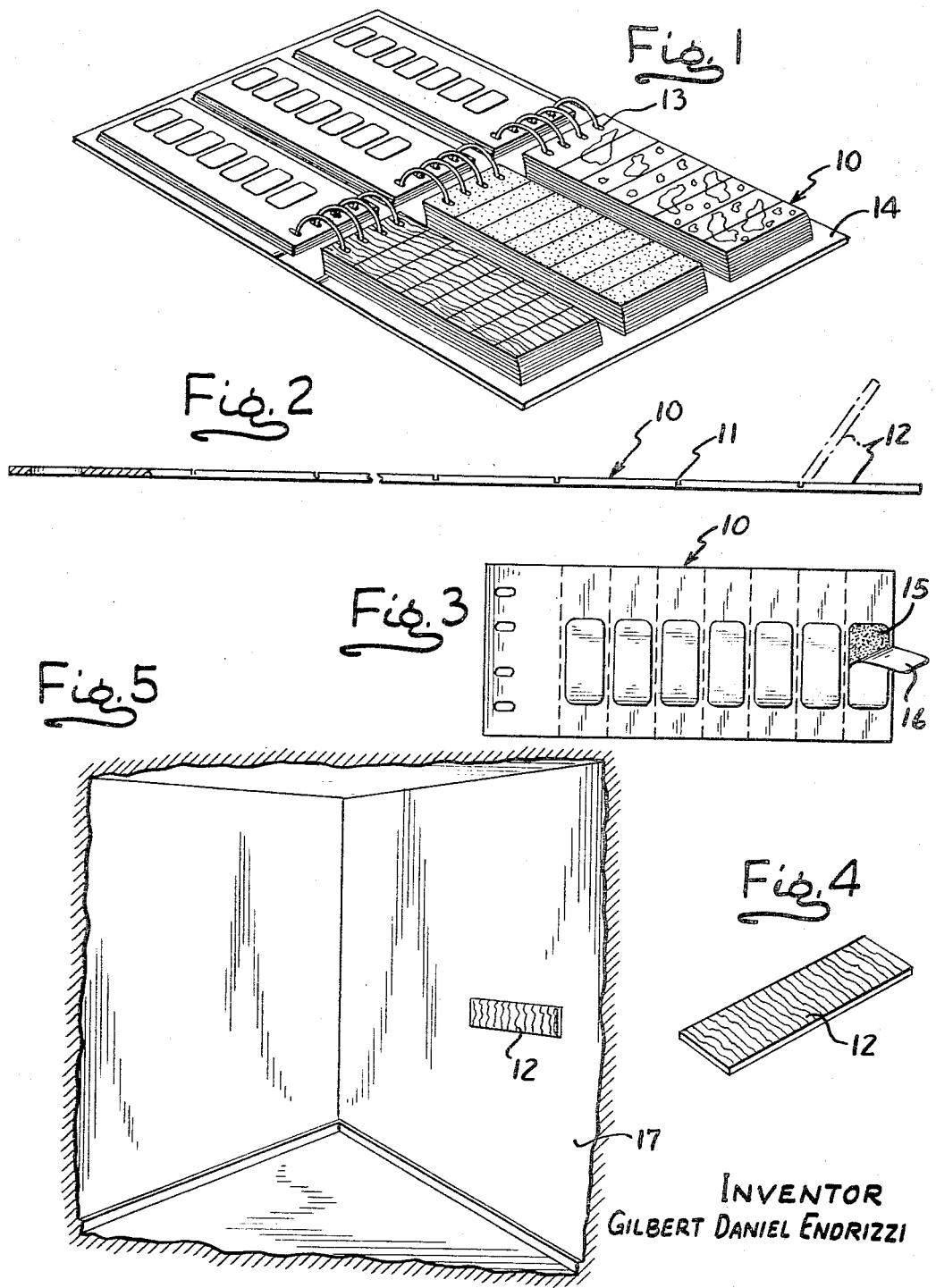

3,313,408
DECORATIVE LAMINATE
Gilbert Daniel Endrizzi, Wisconsin Rapids, Wis., assignor to Consoweld Corporation, Wisconsin Rapids, Wis., a corporation of Wisconsin
Filed July 10, 1964, Ser. No. 381,785
4 Claims. (Cl. 206—82)

This invention relates to decorative laminate, and more particularly to decorative laminate sampling means.

In the merchandising of decorative laminate small sections in the form of strips of for example 2½ by 4 inches of actual laminate are often provided by the manufacturer. These are sometimes punched and a group chained together to illustrate the various colors and patterns comprising the manufacturer's or dealer's line, and whereby an architect or his customer can make a selection. Since these sections are rather bulky, attempts have been made to produce paper imprints, sections of which can be removed or cut and pasted, by the architect or decorator, onto a color presentation so as to give the client an idea of the ensemble or matching of the color and pattern for various proposed applications. However, printed paper samples are not always a true color representation, and thus attempts have been made to cut off small samples of actual laminate and glue them to the desired background. This was often found to be time-consuming and difficult requiring the use of a hack saw to cut through the rigid cured resin-containing samples.

Accordingly it is the object of the present invention to provide the architect, decorator or dealer with actual samples of decorative laminate as heretofore, but which are pre-scored or cut so that relatively small specimens may be broken off by hand and the balance retained for further exhibition. The present invention further provides each of the separable portions or chips with adhesive backing means whereby the architect or decorator can readily attach the chip to a color presentation in true fidelity.

Other objects and advantages of the present invention, its details of construction and arrangement of parts, will be apparent from a consideration of the following specification and accompanying drawings wherein;

FIG. 1 is a perspective view illustrating a ring binder hook containing a plurality of decorative laminate strips formed in accordance with the present invention.

FIG. 2 is a relatively large side elevational view, with parts broken away, of a decorative laminate sample strip in accordance with the present invention.

FIG. 3 is a rear elevational view of a decorative sample strip in accordance with the present invention.

FIG. 4 is a perspective view of a single chip broken away from the decorative laminate sampler strip of the present invention, and FIG. 5 is a fragmentary plan view illustrating the adhering of the chip of FIG. 4 to, for example, a color presentation made by an architect or decorator.

Referring to the drawings, the reference numeral 10 generally indicates a decorative laminate sampler strip formed in accordance with the present invention and which may suitably be a strip of approximately 3½ inches in width and approximately 8 to 9 inches in length and approximately 1/16 inch in thickness.

These strips are actual samples cut from large panels of decorative laminate. As is well known, one form of decorative laminate is composed of a plurality of plies of paper impregnated with phenolic resin overlaid with a printed decorative sheet and surfaced with a transparentizable sheet of paper impregnated with melamine resin, the whole being compressed and heat cured to thermoset condition. Such material is quite rigid in character and pieces thereof cannot be broken off by hand.

In accordance with the present invention, I pre-cut these strips as indicated at 11 to provide a plurality of chips 12 of approximately one inch in length. The decorative laminate as aforesaid is preferably provided with a square cut to a depth of approximately 60–75% of the thickness of the strip so as to permit chips to be readily broken off by manually bending as illustrated by the dotted lines in FIG. 2.

The strips 10 as a whole can be provided with apertures 13 so that they may be engaged in a ring binder book 14 and samples retained therein. Thus, after the chip 12 is broken off from one of the strips 10 the remainder may be retained in the book and when all of the chips have been broken off from the strip the entire strip may be replaced.

FIG. 3 further illustrates that each of the chips adapted to be broken off from the strip 10 are provided with adhesive backing components 15 temporarily protected by stripable cover sheets 16. Thus, the architect or decorator, when wishing to make a presentation to a client and to show in true fidelity how the decorative laminate proposed will look under presentation, will merely manually break off a chip 12 and adhere it to the color drawing presentation 17 as shown in FIG. 5 in a quick and convenient manner. This has an advantage over a paper reproduction and is a true representation of the pattern and color. Moreover, the present construction and arrangement presents an economy in the sampling material necessary to be provided by the manufacturer, while permitting the dealer to retain samples in his book which he might otherwise have to give away and remain without until replaced.

I claim:

1. A decorative laminate sampler comprising a unitary rigid strip having a decorative surface, said strip being divided transversely into a plurality of connected chips by lines of severance extending only partially into the thickness thereof and fully across said decorative face whereby said strip may be manually bent and separated into individual chips representative of said decorative laminate.

2. A decorative laminate sampler comprising a unitary rigid strip having a decorative surface, said strip being divided transversely into a plurality of connected chips by lines of severance extending only partially into the thickness thereof and fully across said decorative face whereby said strip may be manually bent and separated into individual chips representative of said decorative laminate, an end one of said chips being formed with a plurality of apertures whereby said strip may be engaged to a ring binder.

3. A decorative laminate sampler comprising a unitary rigid strip having a decorative surface, said strip being divided transversely into a plurality of connected chips by lines of severance extending only partially into the thickness thereof and fully across said decorative face whereby said strip may be manually bent and separated into individual chips representative of said decorative laminate, the opposed face of each chip carrying pressure sensitive adhesive whereby a separated chip may be adhered to an environmental surfaced sheet.

4. A decorative laminate sampler comprising a unitary elongated rigid strip of decorative laminate cut from a decorative laminate board, said strip being formed adjacent one transverse end with a plurality of apertures whereby said strip may be engaged in a ring binder, said strip having a decorative surface and being transversely divided into a plurality of connected chips by square shaped cut lines of severance extending only partially into the thickness thereof and fully across said decorative surface whereby said strip may be manually flexed and separated into individual chips representative of said board, the opposed face of each chip carrying temporarily covered pressure sensitive adhesive whereby a separated chip may be adhered to an environmental surfaced sheet.

References Cited by the Examiner
UNITED STATES PATENTS

| | | |
|---|---|---|
| 299,052 | 5/1884 | Brooks et al. _____ 206—82 |
| 520,399 | 5/1894 | Purdy. |
| 2,142,194 | 1/1939 | Karfiol. |
| 2,177,914 | 10/1939 | Stienthal _____ 206—82 |
| 2,213,666 | 9/1940 | Burke. |
| 2,704,267 | 3/1955 | Tilden. |
| 2,783,172 | 2/1957 | Avery. |
| 2,889,922 | 6/1959 | Clarvoe. |
| 3,059,766 | 10/1962 | Jordt. |

LOUIS G. MANCENE, *Primary Examiner.*

W. T. DIXSON, *Assistant Examiner.*